United States Patent [19]

Tanigawa et al.

[11] 3,790,758

[45] Feb. 5, 1974

[54] CARD READER

[75] Inventors: Shizuhiko Tanigawa, Moriguchi; Shinzaburo Ishikawa; Natsumi Ono, both of Hirakata, all of Japan

[73] Assignee: Matsushita Electric Industrial Co., Ltd., Osaka, Japan

[22] Filed: June 19, 1972

[21] Appl. No.: 264,331

[30] Foreign Application Priority Data

June 22, 1971 Japan .......................... 46-54317[U]
June 22, 1971 Japan .......................... 46-54318[U]
June 22, 1971 Japan .......................... 46-54319[U]

[52] U.S. Cl. .......................................... 235/61.11 R
[51] Int. Cl. .......................................... G06k 7/01
[58] Field of Search. 235/61.7 B, 61.11 R, 61.11 A, 235/61.11 B, 61.11 C; 200/46; 340/149, 149 A

[56] References Cited

UNITED STATES PATENTS 3,627,994 12/1971 Sallach et al. .................. 235/61.7 B

OTHER PUBLICATIONS

G. W. Bowers, Jr. and E. G. Laenen, Credit Card Reader, IBM Technical Disclosure Bulletin, Vol. 9, No. 12, May, 1967, pps. 1760, 1761.

*Primary Examiner*—Daryl W. Cook
*Attorney, Agent, or Firm*—Stevens, Davis, Miller & Mosher

[57] ABSTRACT

A card reader for reading the predetermined information stored on a card, comprising a card kicker plate slidable in the direction of card insertion and capable of contacting with the end of an inserted card. After reading an inserted card, the card kicker plate is moved to elevate the read card from the device by a certain amount, thereby making the ejection of the card easy.

8 Claims, 12 Drawing Figures

PATENTED FEB 5 1974 3,790,758

CARD READER

This invention relates to a card reader for reading a card which stores predetermined information by way of transparent holes or magnetic means, and more particularly to a card reader capable of kicking out a card to a predetermined position after reading the card, thereby making the ejection of the card easy.

Recently, it has become the practice that information signals are recorded in a card and such a card is inserted in a card reader to read out said information signal for automatically controlling an instrument according to the read-out information or identifying the owner of the card.

It is desired that such cards be small for the convenience of storage and carrying them about. For recording the required information on a limited small card, a large area of the card should be used for the record of the information and thereby the card should be fully and deeply inserted into a card reader. Then, the retrieval of the card is not easy.

An object of the invention is to provide a card reader which can spring up a card having been inserted in the reader to a certain height after reading of the card, thereby making the ejection of the card easy.

Another object of the invention is to provide a card reader which can spring up a card and maintain the card at that position after the card is read by the card reader.

A further object of the invention is to provide a card reader using photoelectric transducer elements and comprising card kicker means.

According to an embodiment of the present invention, there is provided a card reader comprising a substrate, card insertion guide means provided on the substrate and capable of contacting with both side edges of an inserted card and guiding the card along the substrate surface, card stopper means located at the end portion of said card insertion guide means and capable of contacting with one end of an inserted card and limiting the insertion length of the card, card kicker means disposed at the end portion of said card insertion guide means and being slidable along the surface of said substrate in the direction of card insertion, and being capable of contacting with an inserted card, and card kicker plate driving means contacting with the card kicker plate and being capable of moving said card kicker plate in the direction opposite to the card insertion.

Further objects and features of the invention will become apparent in the following description made in connection with the accompanying drawings, in which.

Figure 1:
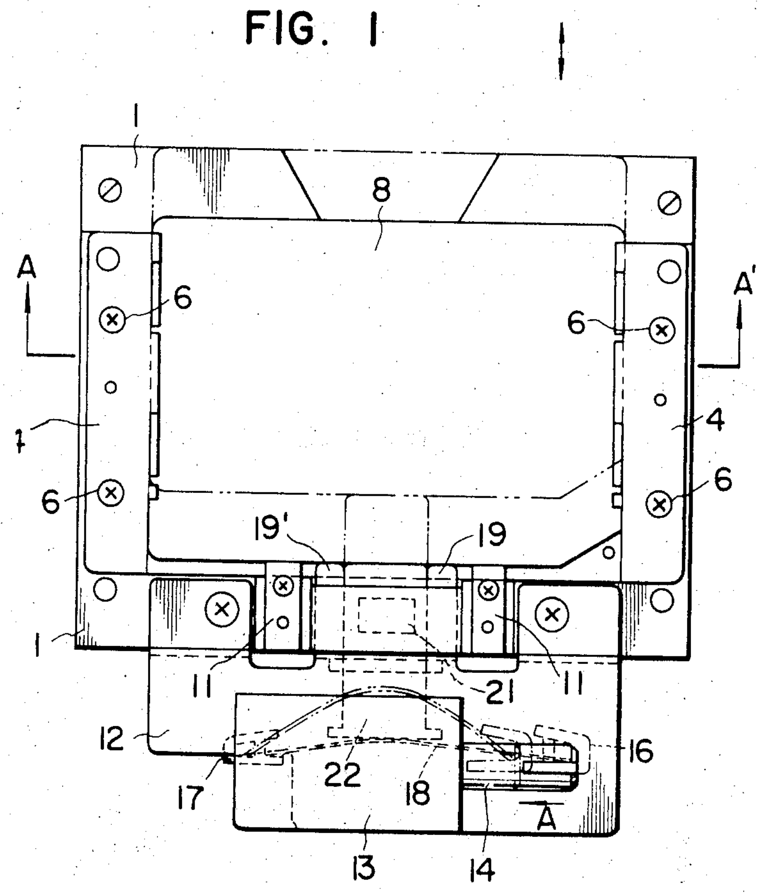
FIG. 1 is a plan view of an embodiment of a card reader according to the invention.
Figure 2:
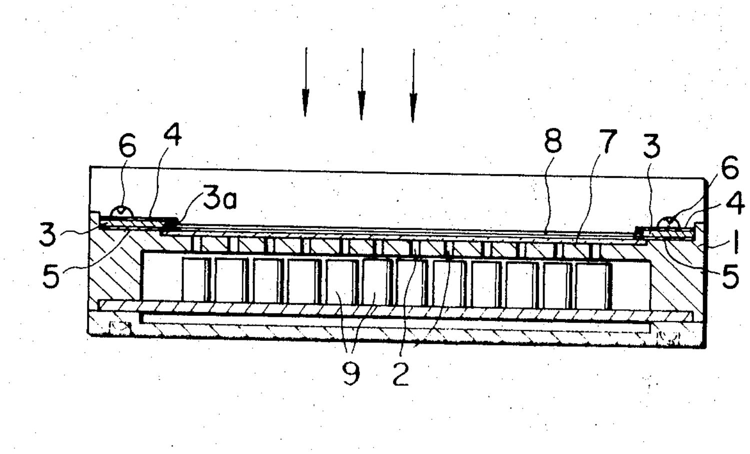
FIG. 2 is a cross sectional view of a card reader taken along line A – A′ shown in FIG. 1.

Referring to the figures, a substrate 1 has a multiplicity of transparent holes 2 on the surface and a glass plate 7 is mounted on said surface of the substrate 1. On the both side edges of the substrate 1, two plate members 4 and 5 are fixed by screws 6 through a spacer 3 which has a thickness more or less larger than that of the cards to be used. Said plate member 5 works to press and fix said glass plate 7 on the substrate 1. The existence of said spacers 3 between said plate members 4 and 5 forms a guide groove **3*a* for card insertion. Namely, the spacers 3 on the both side edges limit the transverse position of an inserted card 8 in said card guide groove 3*a*. Here, similar effects can be obtained without the use of this spacer 3 by providing an offset portion in one of the plate members 4 and 5**.

Figure 3:
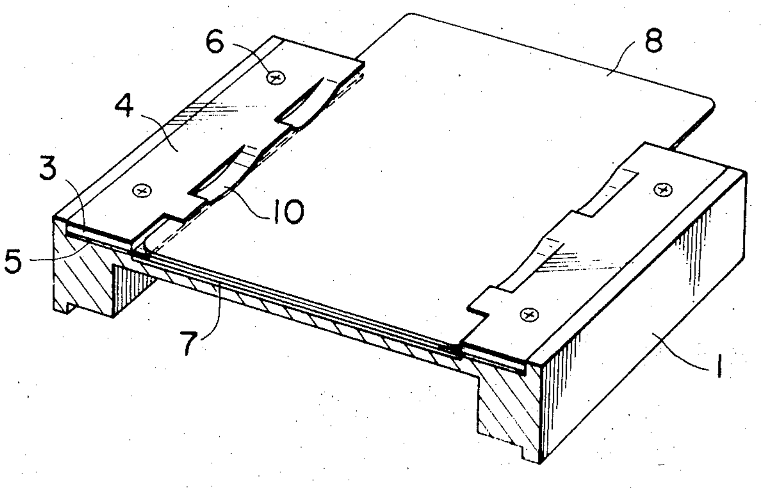
FIG. 3 is a schematic perspective view of the main portion of the card reader of FIG. 1.

Among said two plate members 4 and 5 forming said card guide groove **3*a*, the plate 4 forming the outer groove wall is made of a resilient material, for example a stainless spring steel, and is provided with tongues 10 formed by cutting off unnecessary portions at the edge portion forming the outer side wall of the guide groove 3*a*, as is clearly shown in FIG. 3. These tongues 10 are bent to project inward and form card pressing springs which press an inserted card 8** to the substrate side.

The photoelectric transducer elements 9 are provided corresponding to the respective transparent holes 2 and, after the insertion of a card, are actuated by the light transmitted through the transparent holes provided in the inserted card corresponding to predetermined information and through transparent holes 2 provided in said substrate 1. Thus, the information recorded in a card is read out by the card reader.

Figure 4:
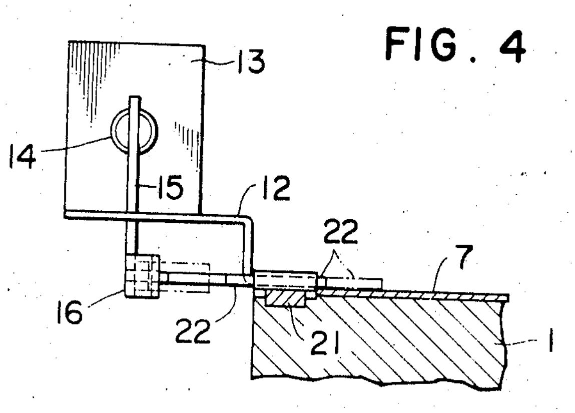
FIG. 4 is a side view of the main portion of the card reader of FIG. 1.
Figure 5:
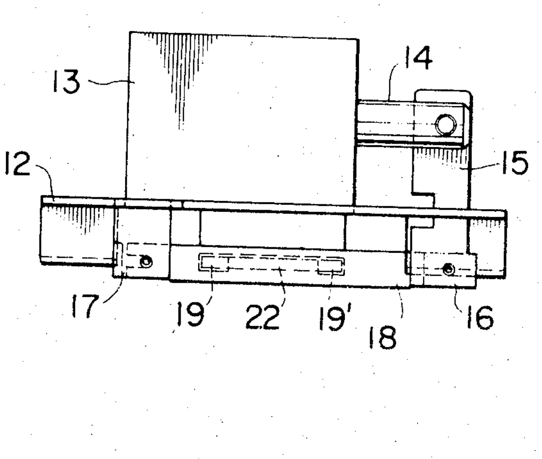
FIG. 5 is a back view of the main portion of the card reader of FIG. 1.
Figure 6:
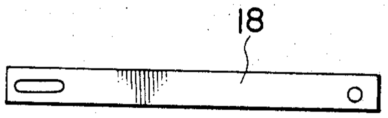
FIG. 6 is a plan view of an example of a leaf spring.

A pair of card stoppers 11 are fixed on the substrate 1 so that and located at the end of said grooves 3a so as to limit the insertion depth of a card 8. A support plate 12 is bent stepwise as is shown in FIG. 4 and fixed at its one end on the substrate. The other end of the support 12 is arranged to project from said substrate 1. A solenoid 13 is fixed on the projected portion of the support plate 12. The solenoid is associated with a plunger 14. A movable arm 15 has its one end fixed to said plunger 14 and has an approximately U-shaped support 16 for a leaf spring 18 at the other end. The movable arm 15 penetrates through a hole formed in said support plate 12 and is movable along said hole in company with the movement of the plunger 14 which is indicated by arrow A in FIG. 1. Another U-shaped support 17 for a leaf spring 18 is fixed on the support plate 12. A leaf spring 18 as shown in FIG. 6 is bridged across said spring supports 16 and 17.

Figure 7:
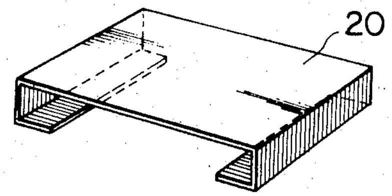
FIG. 7 is a perspective view of a retainer leaf spring.
Figure 8:
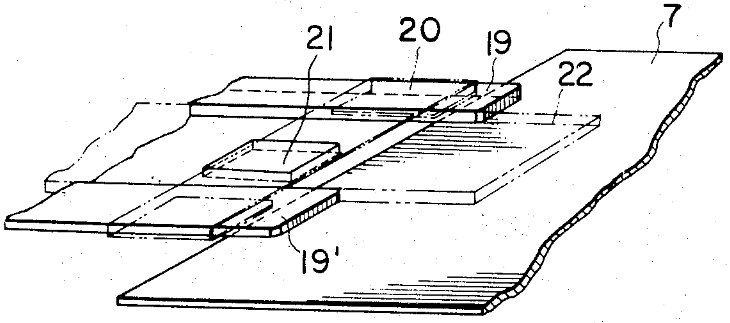
FIG. 8 is a perspective view showing how the retainer leaf spring is assembled in the reader.

A pair of guide projections 19 and 19′ are disposed parallel to each other on the substrate 1, and in this embodiment, are integral with the support plate 12. A pressing leaf spring 20 has such a shape as is shown in FIG. 7 and has its both ends engaged with said respective guide projections 19 and 19′. A card kicker plate 22 made of a magnetic material is disposed slidably between said guide projections 19 and 19' in the direction of card insertion. One end of the kicker plate contacts with said leaf spring 18 and the other end can contact with an inserted card 8. Said pressing leaf spring 20 is used for preventing said card kicker plate 22 from escaping from between the guide projections 19 and 19'. A magnet 21 is embedded in that surface portion of the substrate 1 between said guide projections 19 and 19' which faces against said kicker plate 22. The magnet 21 attracts said kicker plate 22 and this works to stop the movement of the kicker plate 22. Namely, without any external force, the kicker plate 22 is retained at the position by the magnet 21.

Now, the operation of the device will be described. First, on inserting a card the solenoid 13 is in the rest state (not actuated) and thereby the plunger 14 lies at the position indicated in solid line in FIG. 1. Thus, the leaf spring 18 takes a linear shape. An inserted card 8 is positionally limited by the card stoppers 11 and retained at the predetermined position as is shown in solid line in FIG. 1. Then, read-out of the card is done. After the read-out, the solenoid 13 is activated to attract the plunger 14 in the direction shown by arrow A and thereby to bend the leaf spring 18 as is shown in chain line in FIG. 1. This bending of the leaf spring 18 moves up the card kicker plate 22 against the retaining force of the magnet 21, thereby pushing up the card 8.

After the activation of the solenoid 13 is finished, the card kicker plate 22 is retained at the elevated position by the retaining force of the magnet 21.

When another card is inserted thereafter, the card kicker plate 22 is pushed down by the insertion of the card against the retaining force of the magnet 21 and takes the state shown in FIG. 1.

Figure 9:
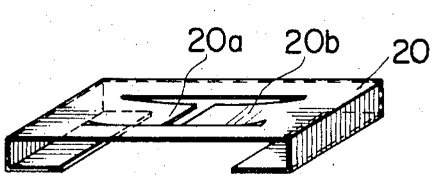
FIG. 9 is a perspective view of another example of a retainer leaf spring.

FIG. 9 shows another embodiment of a retaining means for retaining a kicked card. A pair of pressing tongues 20*a* and 20*b* are cut and bent in the central portion of a pressing leaf spring 20 and press the card kicker plate 22 on the sliding surface to prevent movement.

Figure 10:
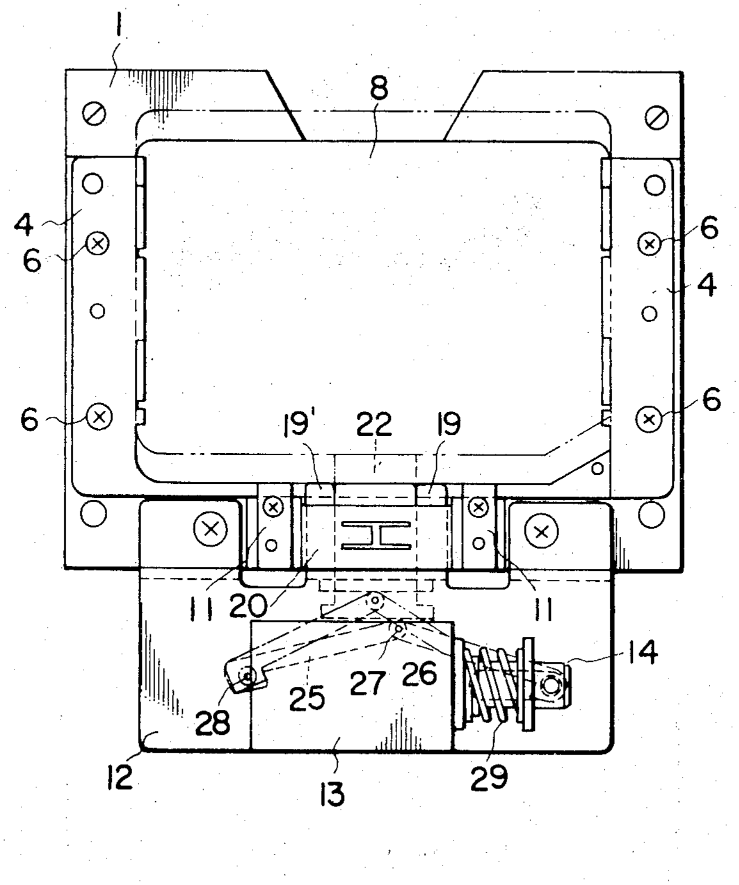
FIG. 10 is a plan view of another embodiment of the invention.
Figure 11:
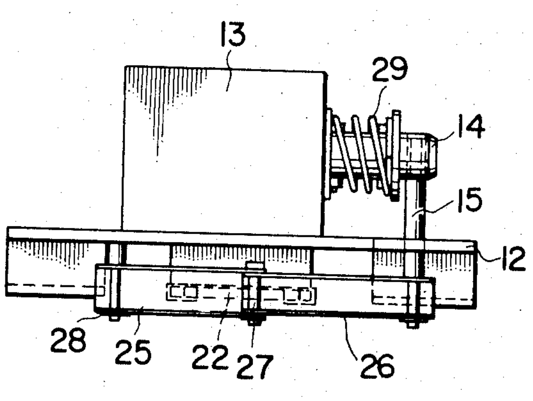
FIG. 11 is a back view of the card reader of FIG. 10.

FIG. 10 shows another embodiment of a means for driving a card kicker plate 22, in which a linked mechanism is employed in place of a leaf spring 18 in the preceding embodiment. Two arms 25 and 26 are coupled pivotably by a pin 27. The other end of the arm 25 is pivoted to the support plate 12 by a pin 28, and the other end of the arm 26 is coupled to a movable arm 15 coupled to the plunger 14. When an inserted card is read and is to be kicked out, the solenoid 13 is activated to pull the movable arm 15 in the direction indicated by arrow A so that the coupling point of the arms 25 and 26 is moved upward and thus pushes up the card kicker plate 22, as is shown by chain lines in FIG. 10. Here, a spring 29 gives a returning force to the plunger.

Figure 12:
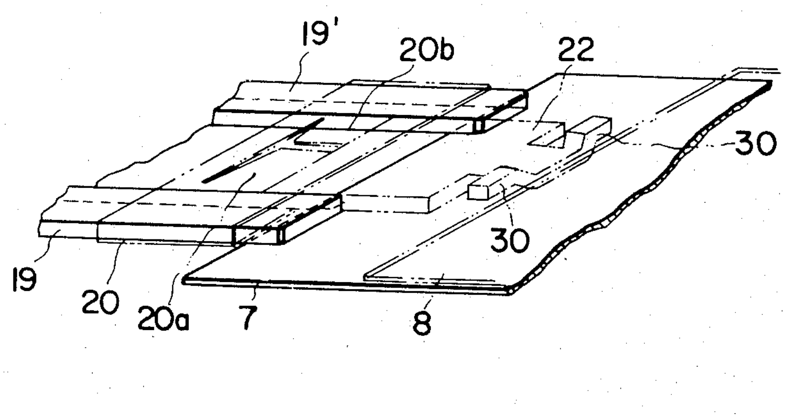
FIG. 12 is a perspective view of an alternative embodiment of a kicker plate.

FIG. 12 shows another embodiment, in which both side ends 30 of the card kicker plate 22 are lifted somewhat from the sliding surface. In this embodiment, even if the leading edge of an inserted card is somewhat separated from the sliding surface, the kicker plate 22 can contact with and kick up the card.

In the above embodiments, an inserted card is positioned on the plate member 5 and there is a minute clearance between the card 8 and the glass plate 7 so that the dirt on the card 8 is prevented from attaching unnecessarily to the glass plate 7. The plate member 5, however, can be dispensed with and a card may be slid directly on the glass plate 7.

What we claim is :

1. A card reader comprising:

a substrate;

card insertion guide means provided on the substrate and capable of contacting with both side edges of an inserted card and guiding the card along a surface of the substrate;

card stopper means located at the end portion of said card insertion guide means and capable of contacting with one end of an inserted card and limiting the insertion length of the card;

a card kicker plate disposed at the end portion of said card insertion guide means and being slidable along the surface of said substrate in the direction of card insertion, and capable of contacting with an inserted card;

a support plate for maintaining the sliding position of said card kicker plate; and card kicker plate driving means contacting with the card kicker plate and capable of moving said card kicker plate in the direction opposite to the card insertion against the support plate.

2. A card reader according to claim 1, in which said card kicker plate driving means comprises a leaf spring disposed near said card kicker plate, extending in a direction perpendicular to the sliding direction of said card kicker plate, and having at least one end movable in the longitudinal direction of the spring, and means for moving said movable end of the leaf spring in said movable direction.

3. A card reader according to claim 1, in which said card kicker plate driving means comprises a linked mechanism including two arms pivotably coupled to each other, the coupled portion being dosposed near the bottom end portion of said card kicker plate and at least one end of said arm being movable in a direction perpendicular to said sliding direction of the card kicker plate, and means for moving the movable end of said arm.

4. A card reader according to claim 1, in which said card insertion guide means comprises limiting surfaces perpendicular to said substrate surface for contacting with the both side edges of an inserted card and limiting the position of the card in the width direction, and a resilient member disposed near each of said limiting surfaces for pressing the inserted card to the substrate surface.

5. A card reader according to claim 4, further comprising a plate member disposed on the substrate so that it intervenes between an inserted card and the substrate surface.

6. A card reader according to claim 1, in which both side ends of said card kicker plate, capable of contacting with the inserted card, are bent in the direction opposite to the card slidable surface of said substrate.

7. A card reader according to claim 1, in which said card kicker plate is made of a magnetic material and said support plate includes a magnet embedded in a surface portion which corresponds to the card kicker plate.

8. A card reader according to claim 1, in which said support plate contacts with said card kicker plate and comprises a resilient member for pressing said card kicker plate to said substrate surface.

* * * * *